US012159268B2

(12) United States Patent
Pati et al.

(10) Patent No.: US 12,159,268 B2
(45) Date of Patent: Dec. 3, 2024

(54) SYSTEMS, DEVICES, AND METHODS FOR GENERATING PERSONALIZED ELECTRONIC DOCUMENTS

(71) Applicant: Walmart Apollo, LLC, Bentonville, AR (US)

(72) Inventors: Sunil K. Pati, Bentonville, AR (US); Bradley Joseph Kieffer, Rogers, AR (US); Eytan Daniyalzade, San Francisco, CA (US); Prasanna Rajendran, Bentonville, AR (US); Berk Atikoglu, San Francisco, CA (US); Nitin Kaulavkar, Bangalore (IN); Kyle Harmon, Bentonville, AR (US); David Martin Nelms, Rogers, AR (US); Gopi Kishore Danda, Bentonville, AR (US); Aroon Ponnusamy, Centerton, AR (US); Jeffrey S. Downey, Bentonville, AR (US); Prince Antony Michael Joseph, Bentonville, AR (US); Bhooshan R. Neupane, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/000,611

(22) Filed: Jun. 5, 2018

(65) Prior Publication Data
US 2018/0349866 A1    Dec. 6, 2018

Related U.S. Application Data

(63) Continuation-in-part of application No. 15/423,535, filed on Feb. 2, 2017, now abandoned.

(30) Foreign Application Priority Data

Dec. 12, 2016 (IN) .............................. 201611042318

(51) Int. Cl.
*G06Q 20/04*    (2012.01)
*G06K 19/06*    (2006.01)
(Continued)

(52) U.S. Cl.
CPC ..... *G06Q 20/042* (2013.01); *G06K 19/06009* (2013.01); *G06Q 20/102* (2013.01);
(Continued)

(58) Field of Classification Search
CPC .. G06Q 40/04; G06Q 20/102; G06Q 20/3224; G06Q 20/3276; G06Q 20/3672;
(Continued)

(56) References Cited

U.S. PATENT DOCUMENTS 6,123,259 A    9/2000  Ogasawara
8,342,407 B2   1/2013  Williams
(Continued)

FOREIGN PATENT DOCUMENTS

WO    2014123495 A1    8/2014
WO    2018106917       6/2018
WO    2018106919       6/2018

OTHER PUBLICATIONS

USPTO; U.S. Appl. No. 15/423,535; Office Action dated Oct. 14, 2021; (pp. 1-20).
(Continued)

*Primary Examiner* — Bennett M Sigmond
*Assistant Examiner* — Michael J Warden
(74) *Attorney, Agent, or Firm* — Fitch, Even, Tabin & Flannery LLP (57) ABSTRACT

Methodologies, systems, and computer-readable media provided for a system for generating personalized electronic documents and verifying user identity are discussed. The system receives user identification data and check information from a user application. The check information is
(Continued)

validated by the issuer of the check. The system transmits a notification to the user application that includes a machine readable code. The user application presents the machine readable code and the user identification data to a check-in module and automatic processing of the check is initiated.

20 Claims, 8 Drawing Sheets (51) Int. Cl.
*G06Q 20/10* (2012.01)
*G06Q 20/32* (2012.01)
*G06Q 20/36* (2012.01)
*G06Q 20/40* (2012.01)
*G06Q 40/04* (2012.01)

(52) U.S. Cl.
CPC ..... *G06Q 20/3224* (2013.01); *G06Q 20/3276* (2013.01); *G06Q 20/3672* (2013.01); *G06Q 20/4014* (2013.01); *G06Q 20/40145* (2013.01); *G06Q 40/04* (2013.01)

(58) Field of Classification Search
CPC ............. G06Q 20/4014; G06Q 20/042; G06Q 20/40145; G06K 19/06009
USPC .......................................................... 705/39
See application file for complete search history.

(56) References Cited

U.S. PATENT DOCUMENTS

| | | | |
|---|---|---|---|
| 8,370,220 B1 | 2/2013 | Goodwin, III | |
| 9,087,354 B1* | 7/2015 | Hambir | G06Q 20/042 |
| 9,129,340 B1* | 9/2015 | Medina, III | G06T 7/11 |
| 10,368,187 B2 | 7/2019 | Nelms | |
| 10,368,188 B2 | 7/2019 | Nelms | |
| 2002/0029171 A1* | 3/2002 | Senior | G06Q 30/02 705/413 |
| 2002/0072983 A1* | 6/2002 | Teller | G06Q 30/0633 705/26.4 |
| 2002/0138345 A1 | 9/2002 | Dickson | |
| 2003/0139994 A1* | 7/2003 | Jones | G07C 9/25 705/36 R |
| 2004/0044579 A1 | 3/2004 | Leutze et al. | |
| 2004/0098350 A1 | 5/2004 | Labrou | |
| 2004/0104930 A1 | 6/2004 | Stoler | |
| 2006/0089906 A1* | 4/2006 | Rowley | G06Q 20/02 705/40 |
| 2009/0015379 A1 | 1/2009 | Rosenberg | |
| 2010/0078471 A1* | 4/2010 | Lin | G06Q 40/02 235/379 |
| 2010/0262554 A1 | 10/2010 | Elliott | |
| 2010/0280859 A1* | 11/2010 | Frederick, II | G06Q 40/00 382/137 |
| 2011/0191252 A1* | 8/2011 | Dai | G06Q 20/20 705/16 |
| 2012/0308003 A1* | 12/2012 | Mukherjee | H04L 9/3247 380/243 |
| 2013/0067208 A1* | 3/2013 | Brinkman | G06F 9/44505 713/1 |
| 2013/0124414 A1* | 5/2013 | Roach | G06Q 20/3276 705/44 |
| 2013/0181045 A1 | 7/2013 | Dessert | |
| 2014/0006182 A1* | 1/2014 | Wilson | G06Q 50/12 705/15 |
| 2014/0006184 A1* | 1/2014 | Godsey | G06Q 20/08 705/16 |
| 2014/0014721 A1* | 1/2014 | Shima | G06Q 50/30 235/382.5 |
| 2014/0054369 A1* | 2/2014 | Liberty | G06Q 20/3274 235/379 |
| 2014/0114776 A1* | 4/2014 | Solanki | H04W 4/60 705/15 |
| 2014/0188601 A1 | 7/2014 | Buset | |
| 2014/0239057 A1 | 8/2014 | Galvin, Jr. | |
| 2014/0270461 A1* | 9/2014 | Narendra | H04W 12/06 382/137 |
| 2014/0304169 A1 | 10/2014 | Kobres | |
| 2015/0052009 A1* | 2/2015 | Ketchell, III | G06Q 20/065 705/26.8 |
| 2015/0071743 A1 | 3/2015 | Lert, Jr. | |
| 2015/0079942 A1 | 3/2015 | Kostka | |
| 2015/0095234 A1 | 4/2015 | Wong | |
| 2015/0172862 A1 | 6/2015 | Kau | |
| 2016/0125505 A1 | 5/2016 | Goulart | |
| 2017/0316296 A1 | 11/2017 | Ashiura | |
| 2018/0060843 A1* | 3/2018 | Maheshwari | G06Q 50/01 |
| 2018/0165764 A1* | 6/2018 | Pati | G06Q 20/3276 |
| 2018/0167767 A1 | 6/2018 | Nelms | |
| 2018/0167768 A1 | 6/2018 | Nelms | |
| 2018/0349866 A1* | 12/2018 | Pati | G06Q 20/4014 |

OTHER PUBLICATIONS

Martucci, Brian; "Mobile Contactless Cards & Payment Technology—How It Works"; https://www.moneycrashers.com/mobile-contactless-cards-payment-technology/ Published Sep. 14, 2021; 15 pages.
International Search Report and Written Opinion for Application No. PCT/US2017/065112, dated Feb. 23, 2018. 6 pages.
PCT; App. No. PCT/US2017/065112; International Preliminary Report on Patentability dated Dec. 9, 2016; (4 pages).
USPTO; U.S. Appl. No. 15/834,674; Office Action dated Apr. 5, 2018; (33 pages).
USPTO; U.S. Appl. No. 15/834,674; Office Action dated Nov. 8, 2018; (61 pages).
USPTO; U.S. Appl. No. 15/834,674; Notice of Allowance dated Mar. 19, 2019; (12 pages).
International Search Report and Written Opinion for PCT/US2017065115 dated Feb. 9, 2018, pp. 1-14.
PCT; App. No. PCT/US2017/065115; International Preliminary Report on Patentability dated Dec. 9, 2016; (8 pages).
USPTO; U.S. Appl. No. 15/834,747; Office Action dated Apr. 5, 2018; (20 pages).
USPTO; U.S. Appl. No. 15/834,747; Office Action dated Nov. 8, 2018; (30 pages).
USPTO; U.S. Appl. No. 15/834,747; Notice of Allowance dated Mar. 18, 2019; (18 pages).
USPTO; U.S. Appl. No. 15/423,535; Final Office Action mailed Oct. 28, 2020; (22 pages).
USPTO; U.S. Appl. No. 15/423,535; Final Office Action mailed Dec. 11, 2019; (19 pages).
USPTO; U.S. Appl. No. 15/423,535; Non-Final Office Action mailed Apr. 17, 2020; (21 pages).
USPTO; U.S. Appl. No. 15/423,535; Non-Final Office Action mailed Apr. 28, 2021; (20 pages).
USPTO; U.S. Appl. No. 15/423,535; Non-Final Office Action mailed May 30, 2019; (15 pages).

* cited by examiner

SYSTEMS, DEVICES, AND METHODS FOR GENERATING PERSONALIZED ELECTRONIC DOCUMENTS

RELATED APPLICATIONS

This continuation-in-part application claims priority to Indian Patent Application No. 201611042318 entitled "SYSTEMS, DEVICES, AND METHODS FOR GENERATING PERSONALIZED ELECTRONIC DOCUMENTS," filed on Dec. 12, 2016, and U.S. Non-Provisional patent application Ser. No. 15/423,535, entitled "SYSTEMS, DEVICES, AND METHODS FOR GENERATING PERSONALIZED ELECTRONIC DOCUMENTS," filed on Feb. 2, 2017, the contents of both of which are hereby incorporated by reference in their entireties.

BACKGROUND

Various types of online orders and electronic transactions can be placed and processed using electronic devices. Processing these orders sometimes requires the use of order details specific to an individual.

SUMMARY

Embodiments of the present invention utilize a mobile application in concert with a broker system to generate personalized electronic documents and verify a user's identity for financial services transactions. For example, using the mobile application, personalized electronic documents can be generated and a financial services transaction can be initiated prior to the user entering a physical facility for the transaction, thus reducing the time it takes to generate such documents and complete transactions once the user is within the facility.

In one embodiment, a system for generating personalized electronic documents and verifying user identity for financial services transactions includes a server configured to execute a personalized order generation module to receive personalized order details over a network from an application executing on a mobile electronic device associated with a user. The personalized order generation module also generates a personalized electronic document for the user based, at least in part, on the personalized order details. The system also includes a broker computing system configured to execute a user identification module to receive a location identifier and user identification data from the application and transmit a notification to the mobile electronic device in response to an order associated with the personalized electronic document being processed. The location identifier is determined in response to the mobile electronic device scanning a machine readable code. The system also includes a computing device located in proximity to the machine-readable code that is configured to execute a user check-in module. The user check-in module is configured to receive the user identification data from the user identification module, retrieve the order associated with the personalized electronic document from the personalized order generation module following receipt of the user identification data, and initiate processing of the order associated with the personalized electronic document.

In another embodiment, a system for generating personalized electronic documents and verifying user identity for financial services transactions includes a server configured to execute a personalized order generation module to receive personalized order details associated with a user over a network and to generate a personalized electronic document for the user based, at least in part, on the personalized order details. The system also includes a broker computing system configured to execute a user identification module. The user identification module receives a location identifier and user identification data from an application executing on the mobile electronic device and transmits a notification to the mobile electronic device in response to an order associated with the personalized electronic document being processed. The system also includes a computing device located in proximity to the machine-readable code that is configured to execute a user check-in module. The user check-in module receives the user identification data from the user identification module, retrieves the order associated with the personalized electronic document from the personalized order generation module following receipt of the user identification data, and initiates processing of the order associated with the personalized electronic document.

In another embodiment, a method for generating personalized electronic documents and verifying user identity for financial services transactions includes receiving, at a personalized order generation module executed by a server, personalized order details over a network from an application executing on a mobile electronic device associated with a user. The method also includes generating a personalized electronic document for the user via the personalized order generation module based, at least in part, on the personalized order details. The method also includes providing a machine readable code configured to transmit a location identifier to the electronic device in response to being scanned by the electronic device. The method further includes receiving from the application, at a user identification module executed by a broker computing system, the location identifier and user identification data. The method also includes receiving, at a user check-in module, the user identification data from the user identification module. The method additionally includes retrieving an order associated with the personalized electronic document from the personalized order generation module following receipt of the user identification data. The method also includes initiating processing of the order associated with the personalized electronic document and transmitting a notification to the mobile electronic device from the user identification module in response to an order associated with the personalized electronic document being processed.

Additional combinations and/or permutations of the above examples are envisioned as being within the scope of the present disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings are primarily for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present invention will be more fully understood from the following description of exemplary embodiments when read together with the accompanying drawings, in which.

DETAILED DESCRIPTION

Following below are more detailed descriptions of various concepts related to, and embodiments of, inventive methods, apparatus, and systems for generating personalized electronic documents and verifying user identity for financial services transactions. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means "includes but is not limited to", the term "including" means "including but not limited to". The term "based on" means "based at least in part on".

In accordance with some embodiments of the present invention, methodologies, systems, apparatus, and non-transitory computer-readable media are described herein to facilitate generating personalized electronic documents and verifying user identity for financial services transactions. In exemplary embodiments, a personalized order generation module receives personalized order details relating to a financial services transaction. The personalized order details can be received, in some embodiments, from an application executing on a user's mobile electronic device. Once the personalized order details are received, the personalized order generation module generates a personalized electronic document for the user that can be used to initiate and process the desired financial services transaction. In some embodiments, the user can provide an electronic signature or some other identification code or password using the mobile application to verify the user's identity. In exemplary embodiments, the user can create an online account that includes the user's personal information, financial information, or any other personalized information that may be used in generating personalized electronic documents or verifying user identity for financial services transactions. In some embodiments, a secondary form of authentication, such as a PIN, touch ID, or electronic signature may be required in order to generate the personalized electronic document or to process the transaction and may be received through the mobile application.

In some embodiments, once the user arrives at a check-in station where the user can complete the order, the user's mobile electronic device can communicate with a broker computing system to verify the user's identity and determine the user's location. In some embodiments, the mobile electronic device can scan a computer readable code at the check-in location in order to retrieve a location identifier indicating where the user wishes to complete the order. The broker computing system can parse the location data received from the mobile electronic device to determine the user's location and can execute a user identification module in order to verify the user's identity. Once the user's identity has been verified, the user identification module can transmit the user's identification data to a user check-in module that is executed by a computing device located near the computer-readable code. This user check-in module retrieves the appropriate order associated with the personalized electronic document from the personalized order generation module, based on the user identification data. The user check-in module initiates processing of the order associated with the personalized electronic document, and the user identification module transmits a notification to the user's mobile application when the order has been processed (e.g. when a money transfer has been completed to a third party or the individual's account has been credited with incoming funds).

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

Figure 1:
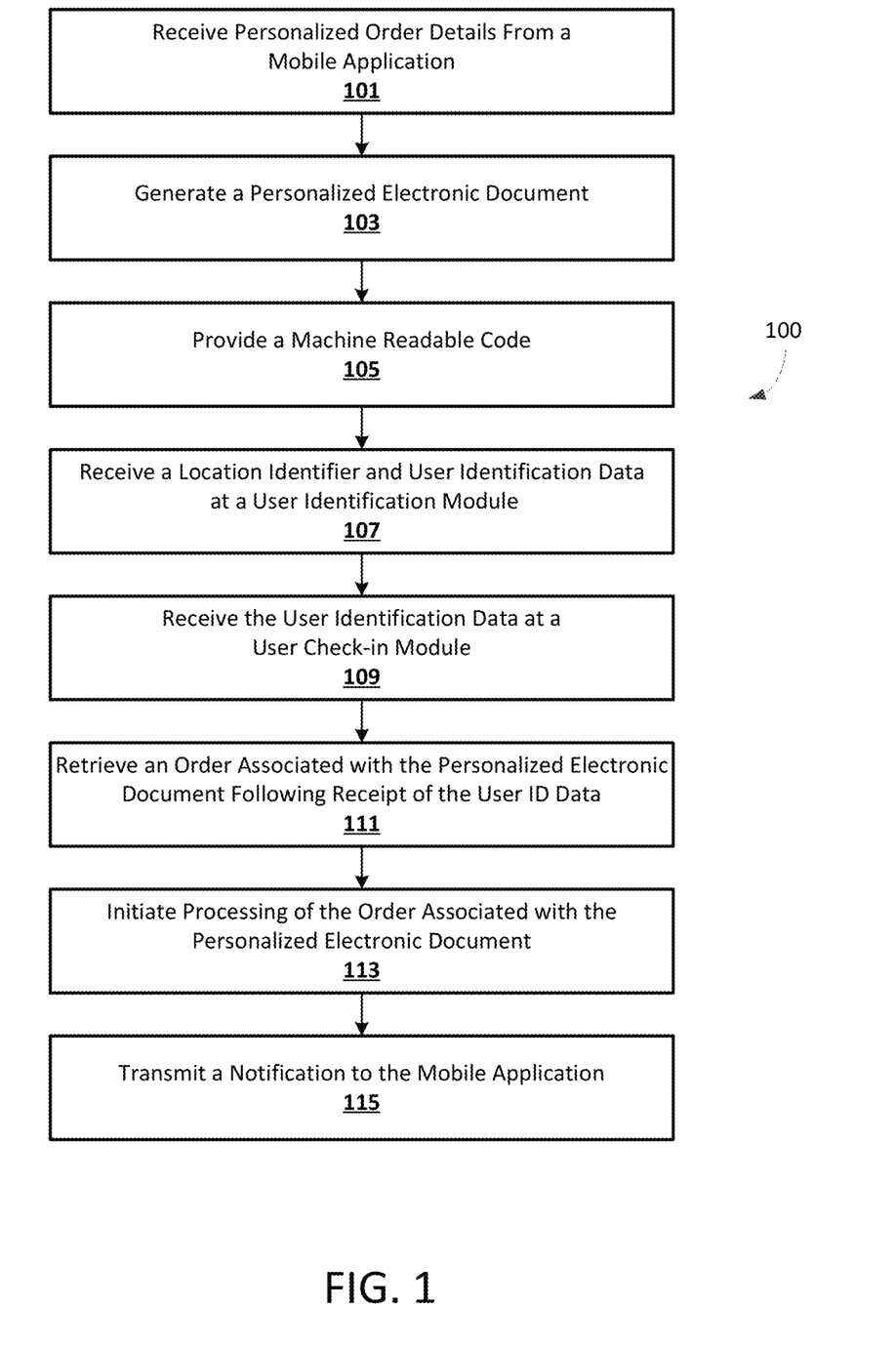
FIG. 1 is a flowchart illustrating an exemplary method for generating personalized electronic documents and verifying user identity for financial services transactions, according to an exemplary embodiment.

FIG. 1 is a flowchart illustrating an exemplary method 100 for generating personalized electronic documents and verifying user identity for financial services transactions, according to an exemplary embodiment. It will be appreciated that the method is programmatically performed by one or more computer-executable processes executing on, or in communication with one or more servers described further below. In step 101, a server executes a personalized order generation module and receives personalized order details over a network from an application executing on a user's mobile electronic device. In some embodiments, the user can transmit the personalized order details to the personalized order generation module using the mobile application in order to initiate generation of a personalized electronic document. In some embodiments, the user has created an online account that includes personal information and the personalized order details.

In step 103, once the personalized order details have been received at the personalized order generation module, the personalized electronic document is generated for the user. The personalized electronic document is generated, at least in part, based on the personalized order details received in step 101. In various embodiments, the personalized electronic document can be generated automatically, or with the help of an individual.

In step 105, a machine readable code, such as a one-dimensional barcode, a two-dimensional barcode, or a matrix barcode, is provided at a particular location. The machine readable code is configured to transmit a location identifier to the user's mobile electronic device in response to the machine readable code being scanned by the mobile electronic device. In some embodiments, the user can scan the machine readable code using a camera of the mobile electronic device. In some embodiments, Bluetooth or other wireless technologies can be used in order to provide a location identifier to the user's mobile electronic device. In other embodiments, the machine readable code can be generated on the user's mobile electronic device and scanned by an electronic device located at or near a user check-in module.

In step 107, a user identification module receives the location identifier and user identification data from the application executing on the mobile electronic device. In some embodiments, the user identification module is executed by a broker computing system in order to verify the user's identity. The user identification data and the user's personalized order details can be stored, in some embodiments, using a user account module.

In step 109, a user check-in module receives the user identification data from the user identification module. The user check-in module can be executed by a computing device located in proximity to the machine-readable code.

In step 111, the user check-in module retrieves an order associated with the personalized electronic document from the personalized order generation module after receipt of the user identification data in step 109. In some embodiments, the personalized order generation module can receive a number of orders from different users, and once the user check-in module knows the identity of the user, it can retrieve the appropriate order from the personalized order generation module.

In step 113, the user check-in module initiates processing of the order associated with the personalized electronic document. In some embodiments, the user has already provided financial information using the user's online account that can be accessed via the application executing on the mobile electronic device. The order can be processed, in some embodiments, using the user check-in module or some other transaction processing terminal. In other embodiments, the processing of the order is performed by a third party entity separate from an entity controlling operation of the server and the broker system.

In step 115, the user identification module executed by a broker computing system transmits a notification to the mobile electronic device once the order associated with the personalized electronic document is processed. In some embodiments, the notification includes a receipt for the order and an explanation of the financial services transaction.

In some embodiments, additional authentication measures, such as a digital signature or PIN, are needed in order to generate the personalized electronic document and verify user identity. In such embodiments, one or more digital signatures associated with the user can be stored at a database or storage location. The digital signature can be retrieved to generate the personalized electronic document and verify user identity, and the digital signature can be received via the application executing on the mobile electronic device.

Figure 2:
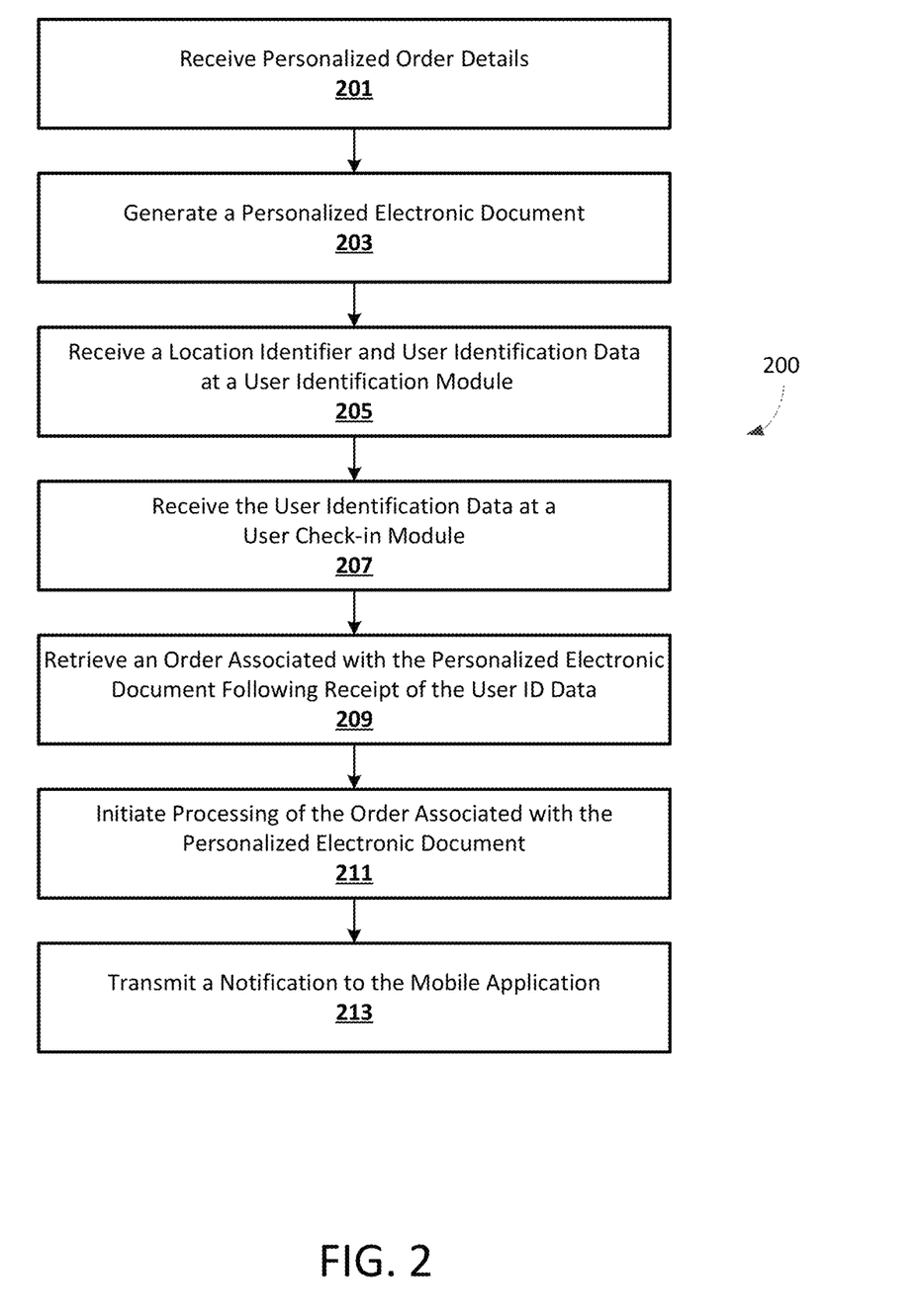
FIG. 2 is a flowchart illustrating another exemplary method for generating personalized electronic documents and verifying user identity for financial services transactions, according to an exemplary embodiment.

FIG. 2 is a flowchart illustrating another exemplary method 200 for generating personalized electronic documents and verifying user identity for financial services transactions, according to an exemplary embodiment. It will be appreciated that the method is programmatically performed by one or more computer-executable processes executing on, or in communication with one or more servers described further below. In step 201, a server executes a personalized order generation module and receives personalized order details over a network. In some embodiments, the personalized order details can be received through an online account associated with a user. In some embodiments, the user's online account includes user identification data as well as the personalized order details.

In step 203, the personalized order details have been received at the personalized order generation module, the personalized order generation module generates a personalized electronic document for the user based, at least in part, on the personalized order details. This electronic document can be used to complete and process an order, such as a financial transaction, in some embodiments.

In step 205, a user identification module executing on a broker computing system receives a location identifier and user identification data from an application executing on a user's mobile electronic device. The location identifier identifies a location where the user wishes to complete the order or financial transaction, and the user identification data is used to verify the user's identity. In some embodiments, the user has created an online account that includes user identification data, and the user identification data can be transmitted to the user identification module from the online account or from the mobile electronic device. In some embodiments, the user's mobile electronic device can determine the location identifier by scanning a machine readable code at or near a user check-in module, as discussed above, or using Bluetooth or other wireless technologies.

In step 207, a computing device located in proximity to the machine-readable code executes a user check-in module and receives the user identification data from the user identification module. Once the user check-in module receives the user identification data, it can retrieve the appropriate order in step 209 associated with the personalized electronic document from the personalized order generation module.

In step 211, the user check-in module initiates processing of the order associated with the personalized electronic document. In some embodiments, the user has already provided financial information via the user's online account, and that account can be accessed via the application executing on the mobile electronic device. The order can be processed, in some embodiments, using the user check-in module or some other financial transaction processing terminal. In other embodiments, the processing of the order is performed by a third party entity separate from an entity controlling operation of the server and the broker system.

In step 215, the user identification module executed by a broker computing system transmits a notification to the mobile electronic device once the order associated with the personalized electronic document is processed. In some embodiments, the notification includes a receipt for the order and an explanation of the financial services transaction.

Figure 3:
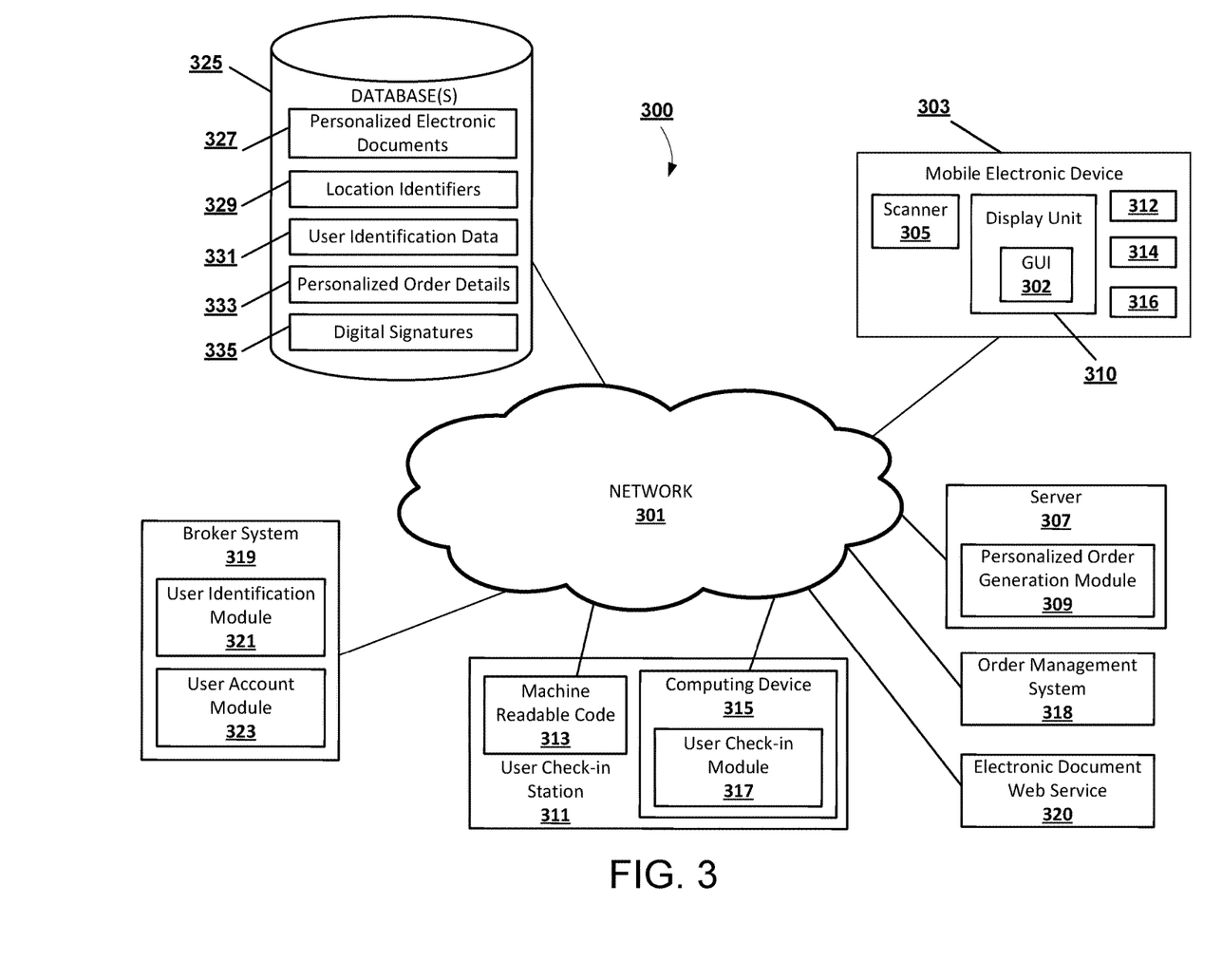
FIG. 3 is a diagram of an exemplary network environment suitable for a distributed implementation of an exemplary embodiment.

FIG. 3 illustrates a network diagram depicting a system 300 suitable for a distributed implementation of an exemplary embodiment. The system 300 can include a network 301, mobile electronic device 303, server 307, order management system 318, computing device 315, machine-readable code 313, broker computing system 319, and a database 325. As will be appreciated, various distributed or centralized configurations may be implemented without departing from the scope of the present invention. In exemplary embodiments, server 307 can store a personalized order management module 309, computing device 315 can store a user check-in module 317, and broker computing system 319 can store a user identification module 321 and a user account module 323, each of which can implement one or more of the processes described herein with reference to FIGS. 1-2, or portions thereof. It will be appreciated that the module functionality may be implemented as a greater or lesser number of modules than illustrated and that the same server, computing device, and broker computing system could also host multiple modules. The database 325 can store the personalized electronic documents 327, location identifiers 329, user identification data 331, personalized order details 333, and digital signatures 335, as discussed herein. In some embodiments, the order management system 318 can store various types of orders, and the personalized order generation module 309 can communicate with the order management system 318 to retrieve the appropriate orders associated with the personalized electronic documents. In some embodiments, the personalized order generation module 309 can communicate with an electronic document web service 320 in order to generate the personalized electronic documents described herein.

In exemplary embodiments, the mobile electronic device 303 may include a display unit 310, which can display a GUI 302 to a user of the mobile electronic device 303. The mobile electronic device can also include a memory 312, processor 314, and a wireless interface 316, as well as a scanner 305 configured to scan machine readable codes. In some embodiments, the mobile electronic device 303 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, smartphones, tablets, netbooks, and the like. The electronic device 300 may include some or all components described in relation to computing device 400 shown in FIG. 4.

The mobile electronic device 303 may connect to a network 301 via a wired or wireless connection. The mobile electronic device 303 may include one or more applications such as, but not limited to, a personalized electronic document application, a web browser, a sales transaction application, an object reader application, and the like. In some embodiments, the computing device 315 and the machine readable code 313 are both located at a user check-in station 311 and the mobile electronic device and/or the user can interact with the computing device 315 executing the user check-in module to complete a financial services transaction.

In exemplary embodiments, the mobile electronic device 303, server 307, order management system 318, electronic document web service 320, computing device 315, machine readable code 313, broker system 319, and database 325 may be in communication with each other via the communication network 301. The communication network 301 may include, but is not limited to, the Internet, an intranet, a LAN (Local Area Network), a WAN (Wide Area Network), a MAN (Metropolitan Area Network), a wireless network, an optical network, and the like. In one embodiment, the mobile electronic device 303, server 307, computing device 315, machine readable code 313, and broker system 319 can transmit instructions to each other over the communication network 301. In exemplary embodiments, the personalized electronic documents 327, location identifiers 329, user identification data 331, personalized order details 333, and digital signatures 335 can be stored at the database 325 and received at the mobile electronic device 303, server 307, computing device 315, and broker system 319 in response to a service performed by a database retrieval application.

Figure 4:
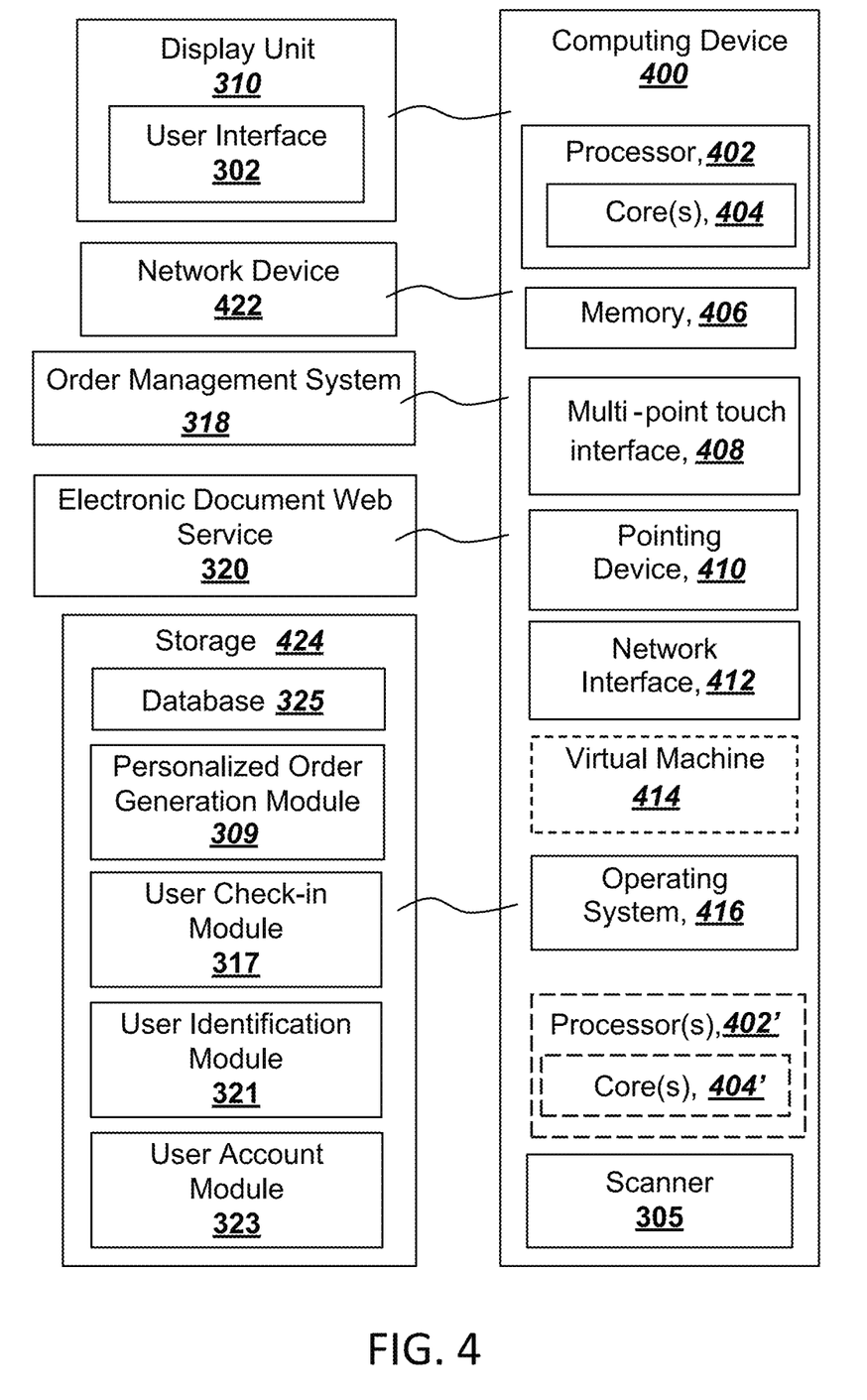
FIG. 4 is a block diagram of an exemplary computing device that can be used to perform exemplary processes in accordance with an exemplary embodiment.

FIG. 4 is a block diagram of an exemplary computing device 400 that can be used in the performance of the methods described herein. The computing device 400 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like.

For example, memory 406 included in the computing device 400 can store computer-readable and computer-executable instructions or software for implementing exemplary embodiments and programmed to perform processes described above in reference to FIGS. 1-2. The computing device 400 also includes processor 402 and associated core 404, and optionally, one or more additional processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' can each be a single core processor or multiple core (404 and 404') processor.

Virtualization can be employed in the computing device 400 so that infrastructure and resources in the computing device can be shared dynamically. A virtual machine 414 can be provided to handle a process running on multiple processors so that the process appears to be using only one computing resource rather than multiple computing resources. Multiple virtual machines can also be used with one processor.

Memory 406 can be non-transitory computer-readable media including a computer system memory or random access memory, such as DRAM, SRAM, EDO RAM, and the like. Memory 406 can include other types of memory as well, or combinations thereof.

A user can interact with the computing device 400 through a display unit 310, such as a touch screen display or computer monitor, which can display one or more user interfaces 302 that can be provided in accordance with exemplary embodiments. The computing device 400 can also include other I/O devices for receiving input from a user, for example, a keyboard or any suitable multi-point touch interface 408, a pointing device 410 (e.g., a pen, stylus, mouse, or trackpad). The multi-point touch interface 408 and the pointing device 410 can be coupled to the display unit 310. The computing device 400 can include other suitable conventional I/O peripherals. The computing device 400 can also include a scanner 305, such as an optical scanner, that can scan and read a machine readable code, as discussed above.

The computing device 400 can also include one or more storage devices 424, such as a hard-drive, CD-ROM, or other non-transitory computer readable media, for storing data and computer-readable instructions and/or software, such as a personalized order generation module 309, a user check-in module 317, a user identification module 321, and a user account module 323 that can implement exemplary embodiments of the methods and systems as taught herein, or portions thereof. Exemplary storage device 424 can also store one or more databases 325 for storing any suitable information required to implement exemplary embodiments. The databases can be updated by a user or automatically at any suitable time to add, delete, or update one or more items in the databases. Exemplary storage device 424 can store one or more databases 325 for storing the personalized electronic documents 327, location identifiers 329, user identification data 331, personalized order details 333, digital signatures 335, and any other data/information used to implement exemplary embodiments of the systems and methods described herein.

The computing device 400 can also be in communication with an order management system 318 that can store various types of orders. In one embodiment, the order management system 318 can store information relating to multiple financial transaction orders, and the personalized order generation module 309 can communicate with the order management system 318 to retrieve the appropriate orders associated with the personalized electronic documents generated, as discussed above. In some embodiments, the personalized order generation module 309 can communicate with an electronic document web service 320 in order to generate the personalized electronic documents.

The computing device 400 can include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 can include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 400 can run operating system 416, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or other operating systems capable of running on the computing device and performing the operations described herein. In exemplary embodiments, the operating system 416 can be run in native mode or emulated mode. In an exemplary embodiment, the operating system 416 can be run on one or more cloud machine instances.

Figure 5A:
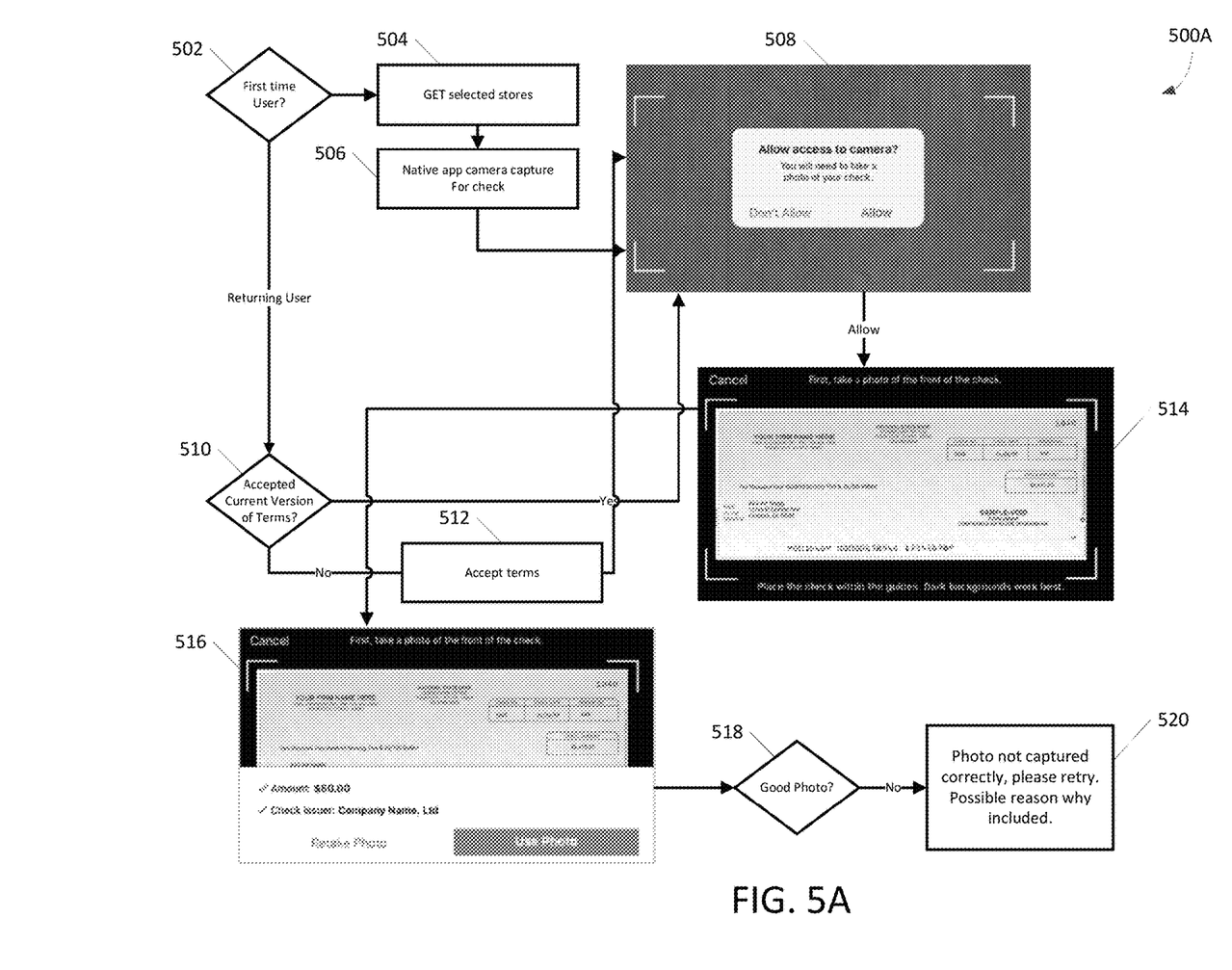
FIGS. 5A, 5B, and 5C are flowcharts illustrating a method for check verification and cashing by verifying user identity for financial services transactions, according to an exemplary embodiment.
Figure 5B:
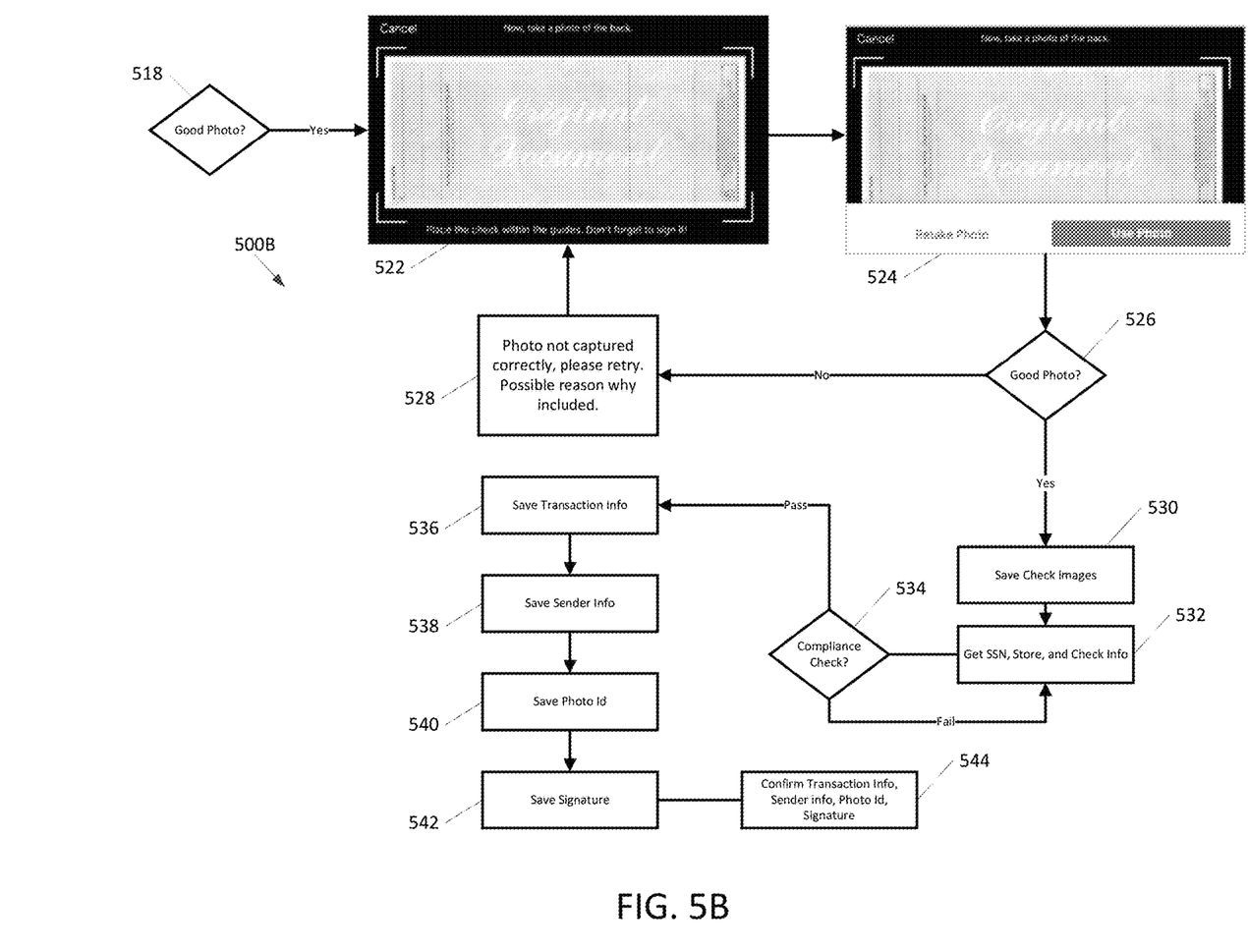
Figure 5C:
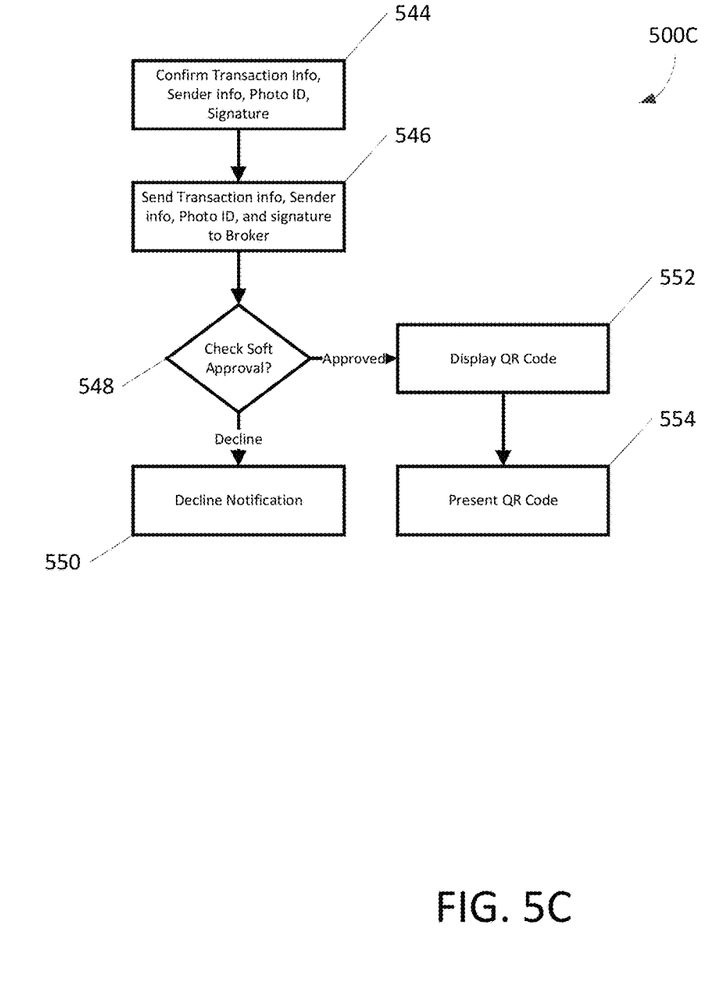

FIGS. 5A, 5B, 5C are flowcharts 500A, 500B, 500C illustrating an exemplary method for check verification and cashing that verifies user identity for financial services transactions, according to an exemplary embodiment. As illustrated in the flowcharts 500A, 500B, 500C, the method, for example, may be implemented as an application executing on a mobile electronic device.

The flowchart 500A begins by determining whether a first time user 502 is attempting to verify and cash a check. In one embodiment, the determination can take the form of a cookie or flag indicating that the user has already attempted to verify and cash a check. Alternatively, if the cookie or flag is not set, the lack of either would indicate a first time user If the user is a first time user, the application may get/retrieve a listing of selected stores 504. Selected stores may include stores the user may have recently visited, stores in close proximity to the user, or stores located along a route to a destination. The application utilizes the mobile electronic device's native app camera capture to capture the check 506.

If the application determines that the user is a returning user, the application may validate whether the user has accepted a current version of the terms of use 510. In one embodiment, the acceptance may be retrieved from application storage space, as a cookie or flag, similar to the first time user check. If the user has not accepted the terms of use, the application prompts the user to accept terms the terms of use 512. Once the terms of use have been accepted the application may prompt the user to allow the application to utilize the native camera application 508.

Upon accepting the prompt to use the native camera application, the application captures an image of the front of the check 514. Once the front image has been captured, the application validates front image 516. The front image may be validated utilizing optical character recognition (OCR) software to validate the fields, including the amount field, of the check. Alternatively, the user may be prompted to input information corresponding to the check fields into the application.

The application evaluates image quality to determine if the image is a good photo 518. If the image is determined to not be a good quality photo based on pre-determined image criteria, the application may indicate that the photo was not captured correctly 520 and for the user to retry.

If quality of the image is adequate, the application captures an image of the back of check 522. Similarly to the previous process of the image of the front of the check, an image of the back of the check is captured, validated 524, and determined to be a good photo 526. If the image is determined to not be a good quality photo, the application may indicate that the photo was not captured correctly 528 and for the user to retry.

Upon having captured a front image and a back image of the check with quality that is adequate, the application saves the check images 530. The images may be saved to local storage, or alternatively may be stored to a networked system.

To facilitate interfacing with the broker computing system 319, the application collects identifying information such as, but not limited to, the user's social security number, store information, and/or check information 532. The store information may include the identity of the selected store obtained through step 504. The check information 532 may be obtained from the validation 516, 524 of the checks.

The application may determine whether the data input complies with required formatting 534. If not in compliance, the application may prompt the user to re-enter their social security number, store information and check information 532.

Upon validating compliance, the application saves the personalized order details. Included in the personalized order details are the saved transaction information 536. The transaction information include data from the check and the store information. The data from the check can include the amount, the payee, the issuer, and the issue date. The store information corresponds to the store at which the check may be redeemed. Included in the store information may be the store number and store address.

The application may also save sender information 538 with the personalized order details. Sender information may correspond to the application's user, or the payee of the check. The information may include a complete legal name, a residential address, and a telephone number.

The application may also save photo identification (ID) information 540 included in the personalized order details. The photo ID information may correspond to information commonly found on a photo ID not including the holder's name and address. For example, the photo ID information may include the type of photo ID, the country of issuance, the state of issuance, an identifying number (e.g. Driver's license number), the holder's date of birth, and an expiration date.

The application may also save a signature 542 of the user as part of the personalized order details. On a mobile computing device, the input and saving of a signature may be facilitated by a touchscreen interface. The signature may be input by a finger or a stylus.

The user may be provided with an opportunity to confirm the personalized order details including transaction information, sender information, photo Id, and signature 544 prior to submittal. The application may display all of the collected information in a tabular form with sections corresponding to each information grouping.

Upon confirmation the system sends 546 the transaction information, sender information, photo ID, and signature to broker computing system 319. The broker computing system 319 validates the user's identification based on the submitted information. Additionally the broker computing system 319 validates the information included with the check to validate the authenticity of the check. The broker computing system 319 may store the transaction information, sender information, photo ID, and signature. The transaction information, sender information, photo ID, and signature may be stored in a database. A digital signature may be created based on the stored information to facilitate retrieval in processing.

Upon submission of the information, the application may check for soft approval 548 from broker computing system 319. The approval may come as a response to the submission. Alternatively the application may query the status for the submission for the soft approval after the submission has been submitted.

If the submission is declined by the broker computing system 319, a declination notification 550 may be displayed on the user device, indicating the failure. Additionally the declination notification may indicate a reason for the declination, as well as steps to remedy.

If approved, the application sends a notification and displays a quick response (QR) code 552. The QR code is linked to the approval of the transaction from the broker computing system 319 indicating that the user is eligible to receive cash. The notification may also contain a receipt or confirmation number for the transaction.

Upon the approval, the user may present the QR code 554 to receive payment of the check. The user may present the QR code to a store associate, a self service kiosk, or a point of sale terminal to redeem the value of their approved transaction. The receiver of the QR code may retrieve the transaction information, sender information, photo ID, and signature information from the broker computing system 319 to validate the completion of the transaction. Additionally the QR code may be redeemed at a third party operator. For example, the QR code and the associated personalized order details may be accessible through a secure interface between the broker computing system 319 and a trusted third party's automated teller system that is capable of reading the QR code.

Figure 6:
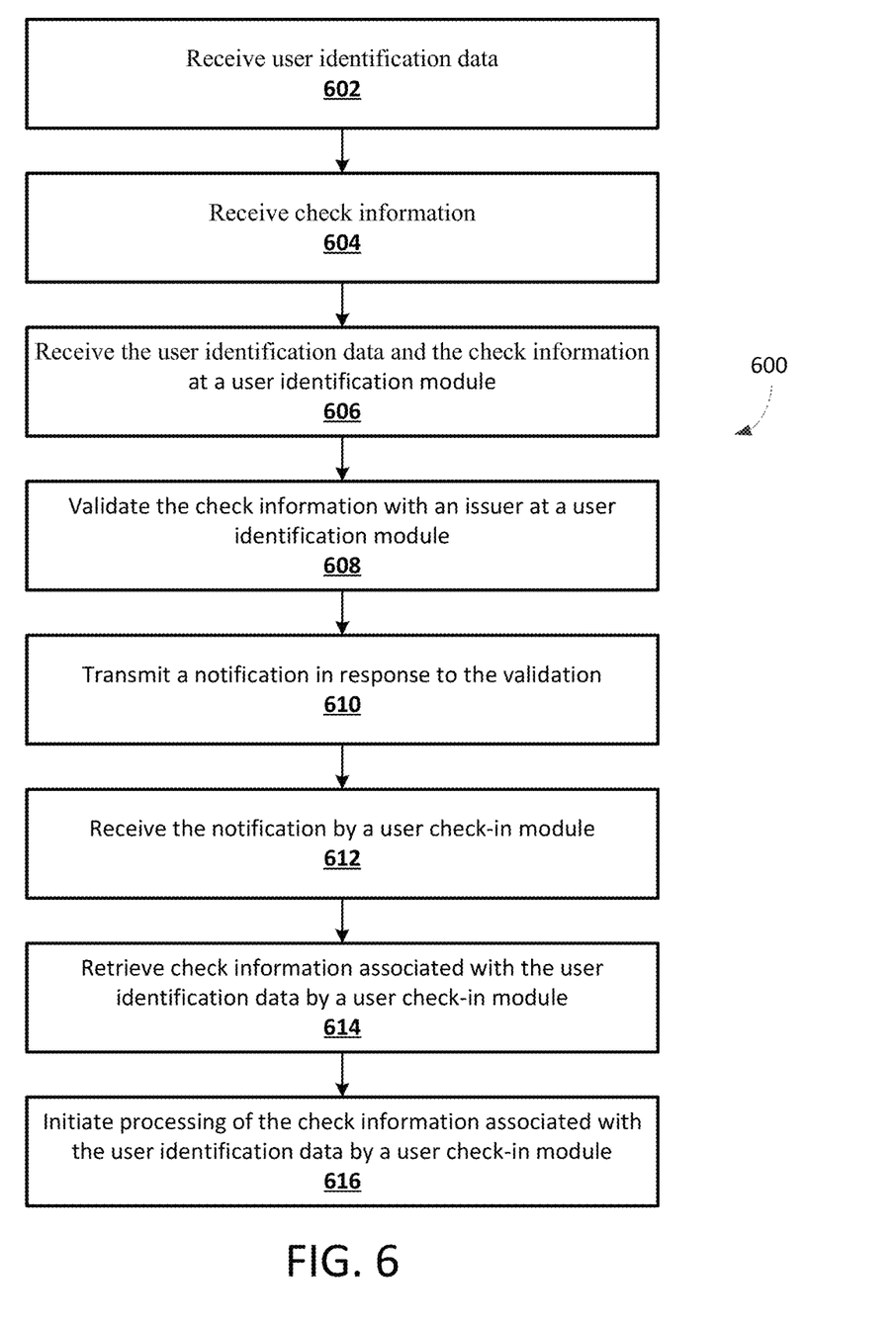
FIG. 6 is a flowchart illustrating another exemplary a method for check verification and cashing by verifying user identity for financial services transactions, according to an exemplary embodiment.

FIG. 6 is a flowchart illustrating another exemplary a method for check verification and cashing that verifies user identity for financial services transactions, according to an exemplary embodiment.

At step 602, a personalized order generation module receives user identification data. The personalized order generation module receives information identifying a user. The user identification data may include transaction information, sender information, photo ID, and signature of the user.

At step 604, the personalized order generation module receives check information. The check information may include information extracted from images of a check. The check information may include but not be limited to amount, payee, issuer, date, account number, routing number and check number.

At step 606, a user identification module receives the user identification data and the check information. The broker computing system 319 receives user identification data and check information through an interface defined by the user identification module.

At step 608, the user identification module validates the check information. The user identification module interface utilizes the check information to validate the authenticity of the check. The validation may include communicating with the issuer's electronic payment systems. Alternatively, a third party payment processing system may be interfaced with to validate issuer's checks.

At step 610, the user identification module transmits a notification in response to the validation. Upon completion of validation, a notification containing a response, whether approved or denied, is transmitted to a user's mobile electronic device. Additionally a machine readable code, (e.g. a QR code) may be included in the notification in the event of approval.

At step 612, a user check-in module receives the notification. The user check-in module may include a machine readable code reader (e.g. QR code reader) for reading the machine readable code transmitted in the notification. The machine readable code is associated with the user identification data utilized in the validation. Upon scanning the machine readable code, the user identification data is provided based on the association.

At step 614, the user check-in module retrieves the check information associated with the user identification data. Based on the retrieved user information data, the user check-in module is able to query associated check information corresponding to the user information data. A digital signature based on the user information data may be utilized to more efficiently retrieve the associated check information.

At step 616, the user check-in module initiates processing of the check information associated with the user identification data. The user check-in module may retrieve an amount of funds corresponding to the amount presented in the check information.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A system for generating personalized electronic documents, verifying user identity for financial services transactions, and autonomously authorizing transactions, the system comprising:
   (i) an application executing on a mobile electronic device associated with a user, the application configured to:
      (a) utilize a camera application on the mobile electronic device to capture an image of a check for verification and cashing;
      (b) extract check information from the image of the check, the check information including an account number, a routing number, a check cashing amount, and a payee; and
      (c) create an online account associated with the user that includes user identification data used to verify user identity;
   (ii) a broker computing system configured to communicate with the mobile electronic device over a network and execute a user identification module that when executed:
      (a) receives from the application executing on the mobile electronic device and via the network, the user identification data and the check information, including the check cashing amount extracted from the image of the check;
      (b) validates the check using the check information extracted from the image; and
      (c) transmits, via the network, an approval notification to the mobile electronic device in response to the validation of the check information, the notification including a machine-readable code linked to the validation of the check information indicating that the user is eligible to receive cash according to the check cashing amount extracted from the image of the check;
      (d) stores the check information in a database of the broker computing system; and
   (iii) a computing device located in proximity to a machine readable code reader, the computing device configured to execute a user check-in module that when executed:
      (a) scans, via the machine readable code reader, the machine-readable code transmitted in the notification and displayed on the mobile electronic device;
      (b) receives the user identification data associated with the machine-readable code;
      (c) retrieves the check information associated with the user identification data, including the check cashing amount from the database of the broker computing system; and
      (d) initiates automatic processing of a check cashing transaction based on the check information.

2. The system of claim 1, further comprising a user account module configured to store the user identification data and the check information.

3. The system of claim 1, wherein the machine readable code includes a one-dimensional barcode, a two-dimensional barcode, a matrix barcode, or a two-dimensional mobile response code.

4. The system of claim 1, wherein the notification includes a confirmation number for the transaction.

5. The system of claim 1, wherein a digital signature associated with the user is stored in a database and retrieved to process the check associated with the user identification data and the check information.

6. The system of claim 1, wherein the processing of the check cashing transaction is performed by a third party entity separate from an entity controlling operation of the broker computing system.

7. The system of claim 1, wherein the user identification data comprises transaction information, sender information, photo identification, and signature.

8. A method for generating personalized electronic documents, verifying user identity, and autonomously authorizing financial services transactions, the method comprising:
   utilizing, by an application executing on a mobile electronic device associated with a user, a camera application on the mobile electronic device to capture an image of a check for verification and cashing;
   extracting, by the application, check information from the image of the check, the check information including an account number, a routing number, a check cashing amount, and a payee;
   creating, by the application, an online account associated with the user that includes user identification data used to verify user identity;
   receiving, by a user identification module of a broker computing system and via a network, from the application executing on the mobile electronic device the user identification data and the check information, including the check cashing amount extracted from the image of the check;
   validating, by the user identification module, the check using the check information extracted from the image of the check;
   transmitting, by the user identification module and via the network, a notification to the mobile electronic device in response to the validation of the check information, the notification including a machine readable code linked to the validation of the check information indicating that the user is eligible to receive cash according to the check cashing amount extracted from the image of the check;
   storing the check information in a database of the broker computing system;
   scanning, via a machine readable code reader of a computing device configured to communicate with the broker system, the machine-readable code transmitted in the notification and displayed on the mobile electronic device;
   receiving, by a user check-in module of the computing device, the user identification data associated with the machine-readable code;

retrieving, by the user check-in module, the check information associated with the user identification data, including the check cashing amount from the database of the broker computing system; and initiating, by the user check-in module, automatic processing of a check cashing transaction based on the check information.

9. The method of claim 8, further comprising storing, via a user account module, the user identification data and the check information.

10. The method of claim 8, wherein the machine readable code includes a one-dimensional barcode, a two-dimensional barcode, a matrix barcode, or a two-dimensional mobile response code.

11. The method of claim 8, wherein the notification includes a confirmation number for the transaction.

12. The method of claim 8, wherein a digital signature associated with the user is stored in a database and retrieved to process the check associated with the user identification data and the check information.

13. The method of claim 8, wherein the processing of the check cashing transaction is performed by a third party entity separate from an entity controlling operation of the broker computing system executing the user identification module.

14. The method of claim 8, wherein the user identification data comprises transaction information, sender information, photo identification, and signature.

15. A non-transitory machine readable medium storing instructions executable by a processing device, wherein execution of the instructions causes the processing device to implement a method for generating personalized electronic documents, verifying user identity, and autonomously authorizing financial services transactions, the method comprising:

creating, at a broker computing system, an online account associated with a user that includes user identification data;

receiving, via a network, by a user identification module, and from an application executing on a mobile electronic device, the user identification data and check information, including account number, a routing number, a check cashing amount, and a payee from an image of a check;

validating, by the user identification module, the check using the check information extracted from the image of the check;

transmitting, by the user identification module and via the network, a notification to the mobile electronic device in response to the validation of the check information, the notification including a machine readable code linked to the validation of the check information indicating that the user is eligible to receive cash according to the check cashing amount extracted from the image of the check;

storing the check information in a database;

receiving, by a user check-in module, the user identification data associated with the machine-readable code from a point-of-sale terminal having a machine readable code reader;

retrieving, by the user check-in module, the check information associated with the user identification data, including the check cashing amount from the database; and initiating, by the user check-in module, automatic processing of a check cashing transaction at the point-of-sale terminal based on the check information.

16. The non-transitory machine readable medium of claim 15, wherein execution of the instructions further causes the processing device to store, via a user account module, the user identification data and the check information.

17. The non-transitory machine readable medium of claim 15, wherein the machine readable code includes a one-dimensional barcode, a two-dimensional barcode, a matrix barcode, or a two-dimensional mobile response code.

18. The non-transitory machine readable medium of claim 15, wherein the notification includes a confirmation number for the transaction.

19. The non-transitory machine readable medium of claim 15, wherein a digital signature associated with the user is stored in a database and retrieved to process the check associated with the user identification data and the check information.

20. The non-transitory machine readable medium of claim 15, wherein the user identification data comprises transaction information, sender information, photo identification, and signature.

* * * * *